Patented July 23, 1940

2,209,196

UNITED STATES PATENT OFFICE 2,209,196

EXPOSURE CONTROL

John Eggert, Leipzig, and Hans Friedrich Nissen, Dessau, Germany, assignors, by mesne assignments, to General Aniline & Film Corporation, New York, N. Y., a corporation of Delaware Application January 26, 1938, Serial No. 186,944
In Germany April 25, 1934

6 Claims. (Cl. 95—75)

Our present invention relates to exposure control and more particularly to an apparatus for the application of a controlled exposure in the photographic reversal process and in the photographic printing process. This application is a continuation in part of our application Ser. No. 94,682 filed August 6, 1936, which is a continuation in part of our application Ser. No. 17,318 filed April 19, 1935, issued as Patent No. 2,101,932, December 14, 1937.

One of its objects is to provide an improved apparatus for exposure control. Another object is an apparatus of this kind which is more efficient than those hitherto known.

A further object is an apparatus for exposure control which is operated exclusively optically and electrically and, therefore, with a minimum of moment of inertia.

Further objects will be seen from the detailed description following hereinafter.

Reference is made to the accompanying drawings in which.

In the second exposure in the production of a reversal film it is necessary to adjust the quantity of light projected on the film in accordance with the density of the photographic image. So also in the printing process the illumination must be selected in dependence on the density of the negative.

A known arrangement for producing an automatic adjustment of the light consists in placing on the other side of the film to be illuminated a device whereby the transmitted light excites a photo-electric cell the current from which moves directly or indirectly a diaphragm in the path of the rays from the illumination lamp. These devices have the draw-back that they are comparatively slow because considerable masses have to be moved, with the disadvantage that in the majority of cases the film or the greater part of it is incorrectly exposed.

In other known arrangements the light is reflected by a turnable mirror, passes through a grey wedge or a diaphragm and is then condensed in the exposure window.

In accordance with the present invention the light from the lamp is, however, condensed on the mirror of the galvanometer. This arrangement is advantageous, because the mirror may be of very small size. The moment of inertia of this system is, therefore, capable of extraordinary diminution. With the apparatus hereinafter described it is not only possible to control the intensity of the printing light in any desired proportion, but it is also possible to adjust the intensity of the printing light according to the density of the film to be exposed while having regard to the special properties of the film used and the photo-cell used. A particular advantage of the apparatus according to this invention is its small inertness which guarantees a rapid adjustment of the intensity. Photo-electric cells of the regenerative type, that is to say, such which are capable to convert light into electric energy, are preferred, for instance, photo-electric cells in which a layer of a finely subdivided semi-conductor is in contact with a layer of a conductor, as in the cuprous oxide cells. However, also the other photo-electric cells may be used.

In order that it may be possible for the sensitivity of the rectifier photo-cell to be modified, according to a further feature of the invention the length of the measuring window is adapted to be adjusted by a separate diaphragm.

Figure 1:
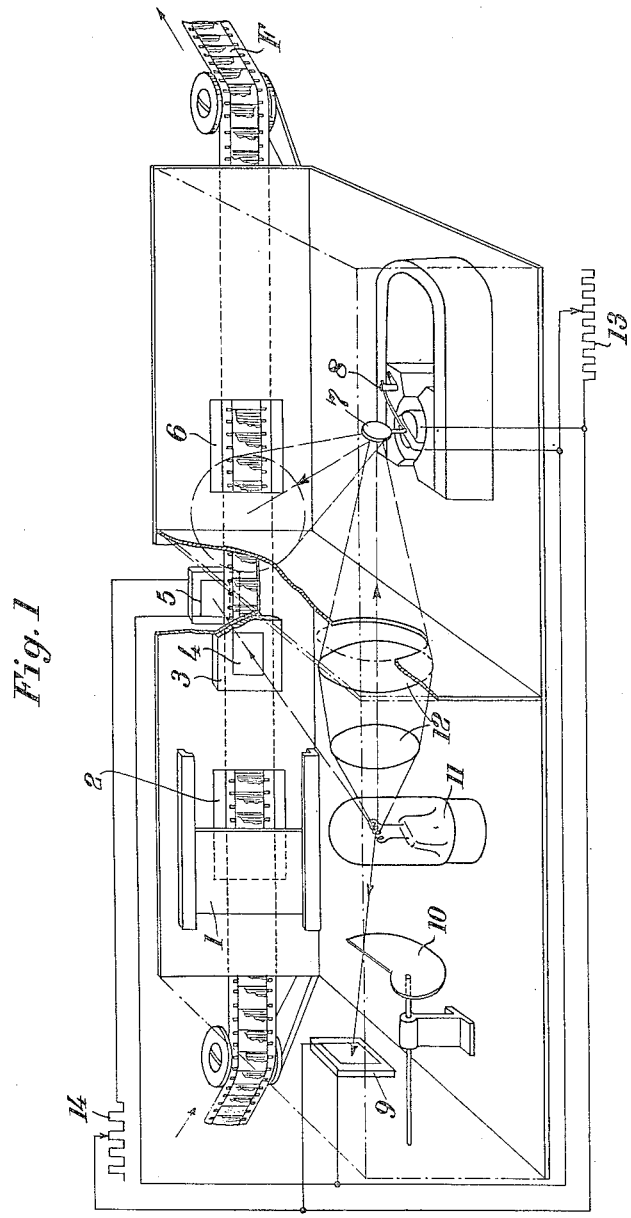
Fig. 1 shows an apparatus according to this invention in which exposure control is effected optically and electrically.
Figure 2:
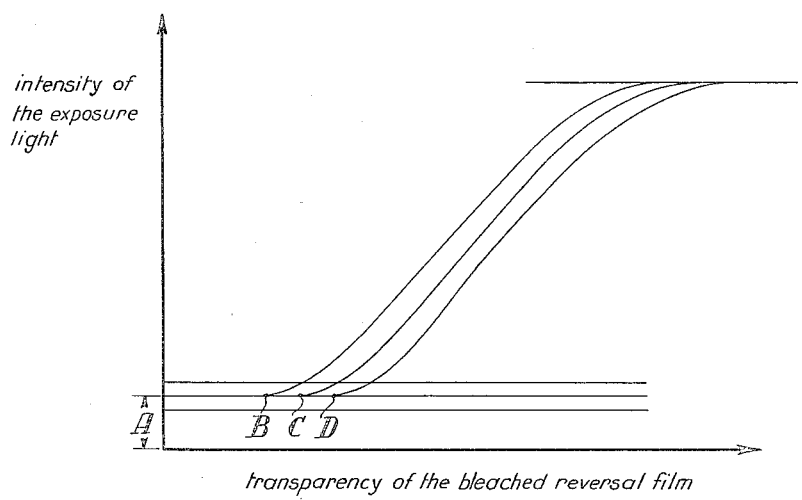
Fig. 2 shows a diagram in which the effect of the diaphragms is illustrated.

In using the apparatus for controlling the intensity of the source of light in the second exposure of a reversal film, it is not necessary to scan the whole breadth of the pictures. The desired width which must, however, not include the perforation row, is blocked out by a mask (Figure 1). In order to obtain correct density of the print at least one picture length must be scanned, preferably there are scanned 4 to 5 picture lengths.

The measuring window comprises an adjustable diaphragm 4. The diaphragm 4 measured in the direction of the width of the film may be limited so that, when a film of a width of 16 mm. is used, only a part thereof is stopped out and the diaphragm, therefore, can be used without any modification with narrower films, for example films of a width of 8 mm. The diaphragm 4 has such dimensions and is arranged in such a manner that a film of standard width and a film of sub-standard width can be tested. The length and breadth of the diaphragm, however, may correspond with the breadth of the image of the 16 mm. film and the breadth of the image of the 8 mm. film respectively. In this case the diaphragm is turnable. With such a diaphragm more exact results are obtained because the whole width of the images is used for measuring.

The apparatus for exposure control according to this invention have the common feature that the light projected, for instance, through the bleached reversal film excites a photo-electric cell. The current of the photo-electric cell actuates a galvanometer provided with a mirror. According to the variations of power of the current the galvanometer is more or less deflected and, therefore, the beam of light projected from a source of light on the mirror. The beam of light may be used directly for exposing the film. In this case the beam of light falls on a fixed mask (diaphragm) having an aperture according to the degree of deflection transmitting more or less light which is evenly distributed on the film plane to be exposed.

In printing from a finished negative or positive an optional source of light may be used and it must only be adapted to excite the photo-electric cell correctly. When scanning a bleached reversal film for a controlled second exposure the source of light is adjusted so that only little blackening of the film is produced. Therefore, in this case a source of light is selected of as small a photographic activity as possible, for instance a source of yellow light.

The direct method provides a rapid adjustment by using a stationary diaphragm and changing the direction of the light rays so that more or less light is projected upon the diaphragm. This method is particularly advantageous if the mirror of the galvanometer is as small as possible. The mirror is arranged at the place where the beam of light condensed by the lens has its narrowest cross section area. It is moreover advantageous if this cross section area is only somewhat larger than the measurements of the glowing body of the lamp. The measurements of this glowing body are also preferably as small as possible.

Referring to Figure 1 the film F is illuminated by the source of light 11. The transmitted light excites the photo-electric cell 5, the current from which actuates a mirror galvanometer. The rays of the lamp are condensed by a lens system 12 on the mirror 7 which reflects the cone of the rays. In the path of this reflected light is the diaphragm 6, which may be the exposure window itself. On account of the inertia, although slight, of the measuring mechanism, the measuring window is so disposed that the film first of all passes the measuring window and only then passes the re-exposure window.

If the current passing through the galvanometer becomes stronger in consequence of a smaller density of the image, the cone of the rays moves gradually behind the diaphragm, the reverse being the case when the density of the image becomes greater. The galvanometer mirror may be so adjusted that there is always a certain minimum quantity of light passing through the diaphragm. There can, however, be provided a separate passage 2 for the light, which may be adjusted by the diaphragm 1. Or the intensity of the measuring light may be regulated by a filter 3.

In parallel with the photo-electric cell 5, which actuates the galvanometer there is inserted a second photo-electric cell 9, which is excited by the illuminating lamp 11. The light necessary for the actuation of the photo-electric cell 5 may be taken from the trace of the rays of the printing light 11 at any place. The quantity of light which falls upon the cell is adjusted by a diaphragm 10.

According to experience the density of a film which is to receive a second exposure varies little. Correspondingly the light falling on the photo-electric cell 5 changes only in small degree; so also does the current from the photo-electric cell which actuates the galvanometer. One can think of these currents together as a constant and one which changes with the density of the image. This constant current is a disturbing factor and is advantageously removed by an equal, opposed current in the galvanometer. This is derived from the photo-electric cell 9. A correct magnitude of the current is secured by a diaphragm 10.

The strength of the testing light falling through the measuring window 4 on to the film can be of such magnitude that the testing light alone suffices for the re-exposure of very strongly underexposed films. In this case the galvanometer mirror would assume such a position that the light for the re-exposure is swung entirely out of the re-exposure window, that is to say the re-exposure window remains dark. This expedient has the advantage that the measuring light is relatively strong. The intensity of light for the second exposure, moreover, cannot be reduced below a certain value although the galvanometer can turn still further.

The effect of the single diaphragms is illustrated in the diagram 2 in which the quantities of light used for the re-exposure are recorded in dependence on the effective transparency of the image part of the film.

The minimum effect A of the exposure is adjusted by the diaphragm 1. If the transparency of the film is great there is also necessary an intense exposure which is obtained by turning the galvanometer so that the mirror throws light into the opening 6, which, for instance, begins at the characters B, C or D. At which transparency light falls through the window depends upon the quantity of light which the diaphragm 10 allows to act on the photo-electric cell 9. This may happen, for instance, at the aforementioned characters B, C or D. The proportion of transparency of the film and increase of the intensity of exposure light is dependent on the sensibility of the cell 5. The adjustment may be made by changing the filter or varying the resistance (13 or 14). The resistance 13 also serves to regulate the speed of adjustment with the aid of its different damping effects.

To the galvanometer there is attached a wire in such a manner that it strikes a stop 8 when the maximum quantity of light falls into the window 6.

What we claim is:

1. An apparatus for exposure control comprising in combination a source of light illuminating a film, a photo-electric device receiving the light from said source of light through said film, said photo-electric device being joined to a galvanometer, a mirror provided on said galvanometer, a lens arranged between said mirror and said source of light in such a manner that an image of the source of light is formed by the lens on the mirror, said image being not at all or only slightly enlarged, and a diaphragm arranged between said galvanometer and said film in such a manner that the light reflected by said mirror partly falls in dependence on the deflection by said mirror through said diaphragm on said film.

2. An apparatus for exposure control comprising in combination a source of light illuminating a film, a photo-electric device consisting of two rectifier cells oppositely connected, one of said cells receiving the light from said source of light through said film, the second cell receiving the light directly from the source, each cell being completely embedded in a separate block of electrically insulating light-permeable material, said photo-electric device being joined to a galvanometer, a mirror provided on said galvanometer, a lens arranged between said mirror and said source of light in such a manner that an image of the source of light is formed by the lens on the mirror, said image being not at all or only slightly enlarged, and a diaphragm arranged between said galvanometer and said film in such a manner that the light reflected by said mirror partly falls in dependence on the deflection by said mirror through said diaphragm on said film.

3. An apparatus for exposure control comprising in combination a source of light illuminating a film, a photo-electric device consisting of two rectifier cells oppositely connected, one of said cells receiving the light from said source of light through said film, the second cell receiving the light directly from the source, each cell being completely embedded in a separate block of electrically insulating light-permeable material, said photo-electric device being joined to a galvanometer, a mirror provided on said galvanometer, a lens arranged between said mirror and said source of light in such a manner that an image of the source of light is formed by the lens on the mirror, said image being not at all or only slightly enlarged, a diaphragm arranged between said galvanometer and said film in such a manner that the light reflected by said mirror partly falls in dependence on the deflection by said mirror through said diaphragm on said film, and a diaphragm having such dimensions and being arranged between said source of light on the one hand and said film and said photo-electric device on the other hand in such a manner that a film of standard width and a film of substandard width can be tested.

4. An apparatus for exposure control comprising in combination a source of light illuminating a film, a photo-electric device consisting of two rectifier cells oppositely connected, one of said cells receiving the light from said source of light through said film, the second cell receiving the light directly from the source, said photo-electric device being joined to a galvanometer, a mirror provided on said galvanometer, a lens arranged between said mirror and said source of light in such a manner that an image of the source of light is formed by the lens on the mirror, said image being not at all or only slightly enlarged, and a diaphragm arranged between said galvanometer and said film in such a manner that the light reflected by said mirror partly falls in dependence on the deflection by said mirror through said diaphragm on said film.

5. An apparatus for exposure control comprising in combination a source of light illuminating a film, a photo-electric device consisting of two rectifier cells oppositely connected, one of said cells receiving the light from said source of light through said film, the second cell receiving the light directly from the source, said photo-electric device being joined to a galvanometer, a lens arranged between said mirror and said source of light in such a manner that an image of the source of light is formed by the lens on the mirror, said image being not at all or only slightly enlarged, a diaphragm arranged between said galvanometer and said film in such a manner that the light reflected by said mirror partly falls in dependence on the deflection by said mirror through said diaphragm on said film, and a diaphragm having such dimensions and being arranged between said source of light on the one hand and said film and said photo-electric device on the other hand in such a manner that a film of standard width and a film of substandard width can be tested.

6. An apparatus for exposure control comprising in combination a source of light illuminating a film, a photo-electric device consisting of two rectifier cells oppositely connected, one of said cells receiving the light from said source of light through said film, the second cell receiving the light directly from the source, each cell being completely embedded in a separate block of electrically insulating light-permeable material, said photo-electric device being joined to a galvanometer, a mirror provided on said galvanometer, a lens arranged between said mirror and said source of light in such a manner that an image of the source of light is formed by the lens on the mirror, said image being not at all or only slightly enlarged, a diaphragm arranged between said galvanometer and said film in such a manner that the light reflected by said mirror partly falls in dependence on the deflection by said mirror through said diaphragm on said film, and a diaphragm arranged between said source of light and said second cell and adapted to control the intensity of the light falling on said second cell.

JOHN EGGERT.
HANS FRIEDRICH NISSEN.